R. B. DISBROW.
COMBINED CHURN, BUTTER WORKER, AND CREAM RIPENER.
APPLICATION FILED JUNE 5, 1912.
1,043,908.
Patented Nov. 12, 1912.
2 SHEETS—SHEET 1.
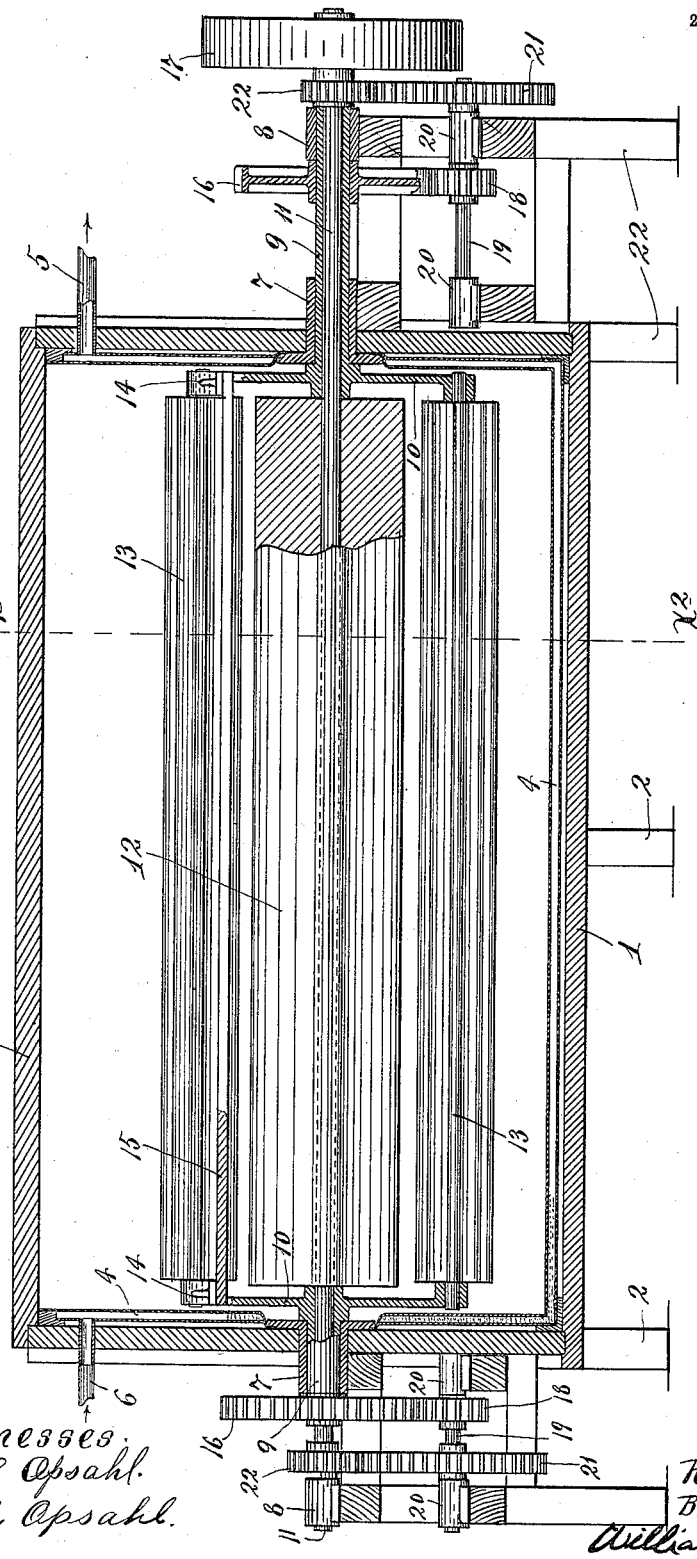

R. B. DISBROW.
COMBINED CHURN, BUTTER WORKER, AND CREAM RIPENER.
APPLICATION FILED JUNE 5, 1912.
1,043,908.
Patented Nov. 12, 1912.
2 SHEETS—SHEET 2.
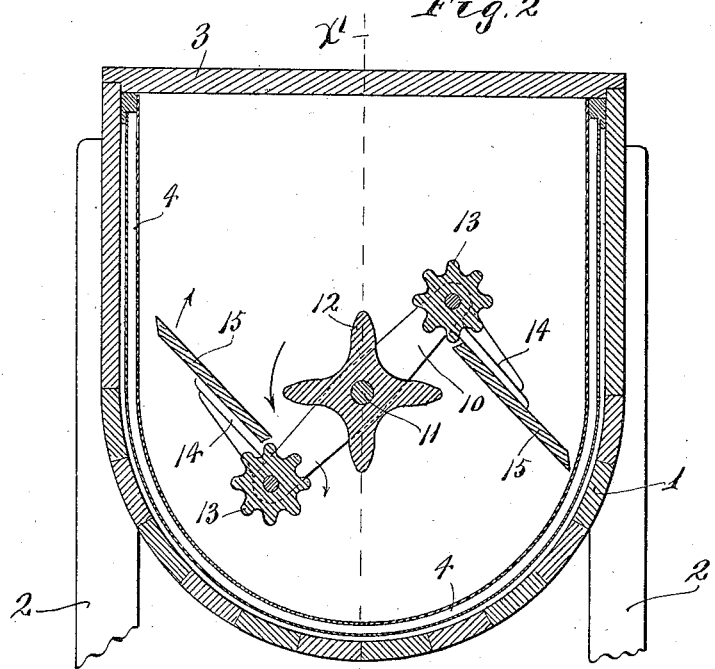
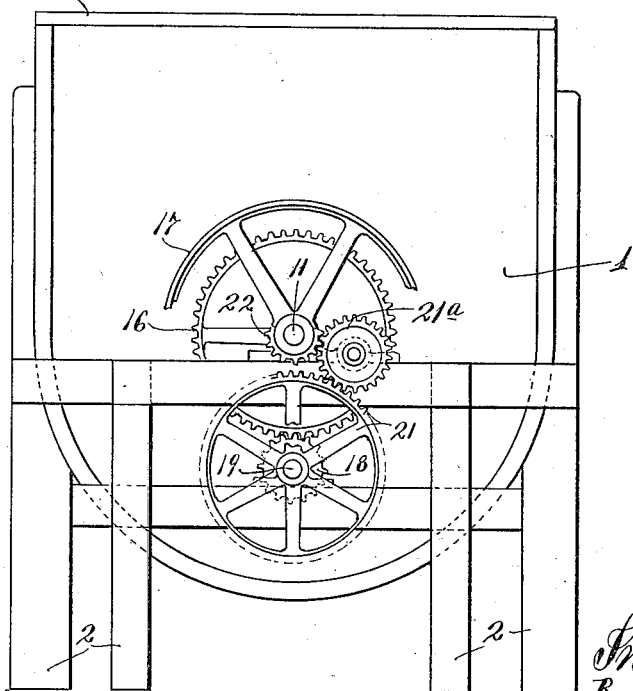

UNITED STATES PATENT OFFICE.

REUBEN B. DISBROW, OF OWATONNA, MINNESOTA.

COMBINED CHURN, BUTTER-WORKER, AND CREAM-RIPENER.

1,043,908.      Specification of Letters Patent.      Patented Nov. 12, 1912.

Application filed June 5, 1912. Serial No. 701,721.

*To all whom it may concern:*

Be it known that I, REUBEN B. DISBROW, a citizen of the United States, residing at Owatonna, in the county of Steele and State of Minnesota, have invented certain new and useful Improvements in Combined Churns, Butter-Workers, and Cream-Ripeners; and I do hereby declare the following to be a full, clear, and exact description of the invention, such as will enable others skilled in the art to which it appertains to make and use the same.

My invention has for its object to provide a combined churn, butter worker and cream ripener, and to such ends, generally stated, the invention consists of the novel devices and combinations of devices hereinafter described and defined in the claims.

In the apparatus equipment of creameries, combined churns and butter workers, are, as is well known, in common use, but hitherto the cream ripener has been constructed as an independent, or individual device. My invention combines these several machines, and thereby effects economy in the cost of apparatus and reduces the floor space required in a creamery of a given capacity.

The so-called cream ripener, is, as is well known, in the nature of a tempering apparatus which is sometimes used to cool the cream, and at other times is used to heat the cream. When used as a heater, the cream may be pasteurized also, in the same apparatus by the application of the required amount of heat. Furthermore, in my improved and combined machine, the desired temperature of the cream may be maintained throughout the churning action, and also the temperature of the butter may be maintained while it is being worked.

The improved and combined machine is illustrated in the accompanying drawings, wherein like characters indicate like parts throughout the several views.

Referring to the drawings, Figure 1 is a vertical section taken through the improved machine on the line $x^1$ $x^1$ on Fig. 2; Fig. 2 is a transverse section taken through the machine on the line $x^2$ $x^2$ on Fig. 1, some parts being broken away; and Fig. 3 shows the machine in end elevation, some parts being broken away.

The numeral 1 indicates a large trough-like tank, preferably constructed of wood, supported by legs 2 and having a removable cover 3. Within the tank 1 is a double wall sheet metal water jacket or liner 4 that follows the bottom, sides and ends of the tank 1, but is preferably spaced slightly therefrom. Water circulating pipes 5 and 6 tap the upper portions and ends of the said water jacket. The central portions of the ends of the jacket 4 are pressed together and united with a water tight joint to afford a passage for bearing sleeves 7 that are passed through and rigidly secured to the heads of the tank 1. Alined with the bearings 7 but located outward thereof, are other bearings 8 that are rigidly secured to the outer supporting legs 2. Long rotary sleeves 9 are extended through and journaled in the alined bearings 7 and 8, and at their inner ends, inside of the water jacket, these sleeves 9 are provided with rigidly secured diametrically extended heads 10, which, as shown, are in the form of diametrically extended arms. A long driving shaft 11 is extended through the sleeves 9 and the tank and water jacket, and is journaled in the said sleeves.

A large central working roller 12 is secured to the shaft 11 and extends between the heads 10. Located equidistant on opposite sides of the central roller 12 are idle or loose working rollers 13 journaled to the extended ends of the heads 10 and coöperating with the said rollers 12. The heads 10 are provided with arm-like extensions 14 that project in opposite directions approximately at right angles to the said heads 10; and to these arms 14, wide lifting flights 15 are rigidly secured. The two lifting or working flights 15 project in opposite directions, and their outer edges are arranged to move very close to the cylindrical bottom portion of the water jacket 4, while the inner edges of the said flights terminate close to the corrugated surfaces of the rollers 13. Preferably, these flights 15 are extended approximately tangentially to the inner portions of the said rollers 13, so that they are well adapted to deliver the butter between the upwardly moving roller 13, and the downwardly rotating side of the central roller 12.

A spur gear 16 is secured to each driving sleeve 9, and a driving pulley 17 is secured to one end of the shaft 11. The gears 16 mesh with spur pinions 18, secured on counter-shafts 19, journaled in suitable bearings 20 on the leg structure 2. The counter-shafts 19 are provided with spur gears 21 that mesh with intermediate gears $21^a$ which, in turn, mesh with spur pinions 22, secured on the ends of the roller shaft 11. The driving connections for the rollers and other moving parts of the machine may take different forms and may be either a one-speed or two-speed mechanism. The driving connections illustrated, however, serve to positively rotate the roller carrying heads 10 at the same speed, and at a speed which is much less than that of the central working roller 12. The direction of rotation of the parts is illustrated by the arrows marked on Fig. 2.

In the churning action, the cream will be agitated by the movement of the lifting flights 15 therethrough and by the rotary movement of the central roller 12, and, together, they produce a highly efficient churning action.

In the butter working action, the butter will be collected and raised by the flights 15, on the left hand side of the tank, as viewed in Fig. 2, and this collected and raised butter will, by the combined action of gravity and the positive feeding action of the central roller 12, be fed downward between the said central roller and the rising idle roller 13. Of course, the idle rollers 13 and flights 15, which are on opposite sides of the central roller, are brought into action in succession.

When the machine is used as a tempering device, either hot or cold water should be continuously circulated through the jacket 4, and while this is being done, the central roller and flights 15 should be kept in action so as to more thoroughly and evenly change the temperature of the cream throughout. Also, as before indicated, the temperature of the cream may be properly regulated while it is being churned, and the temperature of the butter, properly maintained while it is being worked. The device is, therefore, highly efficient for use as a cream ripener.

The advantages of having a compact machine, capable of performing all of the above noted functions, is obvious.

I believe that I am the first to produce a single machine or apparatus capable of the several uses above stated, and hence desire to claim the same broadly.

What I claim is:—

1. In a combined churn and butter worker, the combination with a tank, of a working roller in said tank, a pair of heads spaced longitudinally of said tank and arranged to rotate around the axis of said working roller, a lifting flight carried by said heads around said working roller, and means for rotating said working roller in one direction and said heads in the opposite direction.

2. In a combined churn and butter worker, the combination with a tank, of a working roller in said tank, a pair of heads spaced longitudinally of said tank and arranged to rotate around the axis of said working roller, a roller carried by said heads around said working roller, and means for rotating said working roller in one direction and said heads in the opposite direction.

3. In a combined churn and butter worker, the combination with a tank, of a working roller centrally located in said tank, a pair of rotary heads within said tank spaced longitudinally thereof, lifting flights carried by the said heads around said working roller, and means for rotating said working roller and said heads.

4. In a combined churn and butter worker, the combination with a tank, of a working roller centrally located in said tank, a pair of heads spaced longitudinally of said tank and arranged to rotate around the axis of said roller, a pair of diametrically opposite lifting flights carried by said heads around said working roller, and means for rotating said working roller in one direction and the said heads in the opposite direction.

5. In a combined churn and butter worker, the combination with a tank, of a centrally located working roller, a pair of heads spaced longitudinally of said tank and arranged to rotate around the axis of said roller, a pair of idle rollers carried by said heads, one on each side of said working roller, and means for rotating said working roller in one direction and said heads in the opposite direction.

6. In a combined churn and butter worker, the combination with a tank, of a centrally located working roller in said tank, a pair of heads spaced longitudinally of said tank and arranged to rotate around the axis of said working roller, a pair of diametrically opposite lifting flights, and a pair of diametrically opposite idle rollers carried by said heads and arranged to revolve around said axial working roller, and means for rotating said working roller in one direction and the said heads in the opposite direction.

7. In a combined churn and butter worker, the combination with a tank, of a working roller in said tank, a pair of heads spaced longitudinally of said tank and arranged to rotate around the axis of said working roller, a lifting flight and roller carried by said heads around said working roller, and means for rotating said working roller in one direction and said heads in the opposite direction.

In testimony whereof I affix my signature in presence of two witnesses.

REUBEN B. DISBROW.

Witnesses:
F. D. MERCHANT,
HARRY D. KILGORE.